(No Model.)

J. J. GOETZENBERGER & O. S. WANGSNES.
SOD CUTTING ATTACHMENT FOR PLOWS.

No. 333,849. Patented Jan. 5, 1886.

WITNESSES
B. Fugitt.
Phill Masi.

INVENTORS
Joseph J. Goetzenberger.
Ole S. Wangsnes.
by Anderson & Smith
Their ATTORNEYS

UNITED STATES PATENT OFFICE.

JOSEPH J. GOETZENBERGER AND OLE S. WANGSNES, OF MINNEAPOLIS, MINN.

SOD-CUTTING ATTACHMENT FOR PLOWS.

SPECIFICATION forming part of Letters Patent No. 333,849, dated January 5, 1886.

Application filed September 16, 1885. Serial No. 177,259. (No model.)

*To all whom it may concern:*

Be it known that we, JOSEPH J. GOETZENBERGER and OLE S. WANGSNES, citizens of the United States, residing at Minneapolis, in the county of Hennepin and State of Minnesota, have invented certain new and useful Improvements in Sod-Cutting Attachments for Plows; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
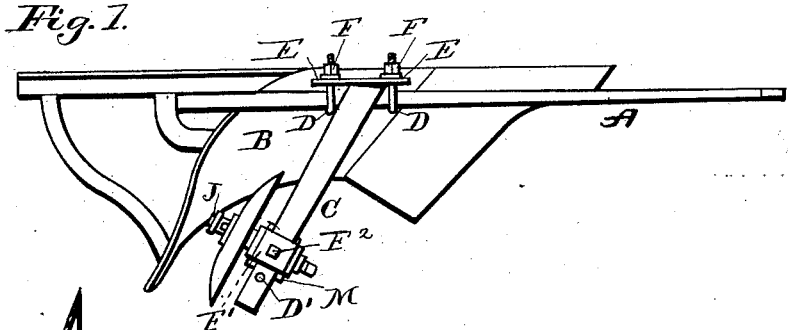
Figure 2:
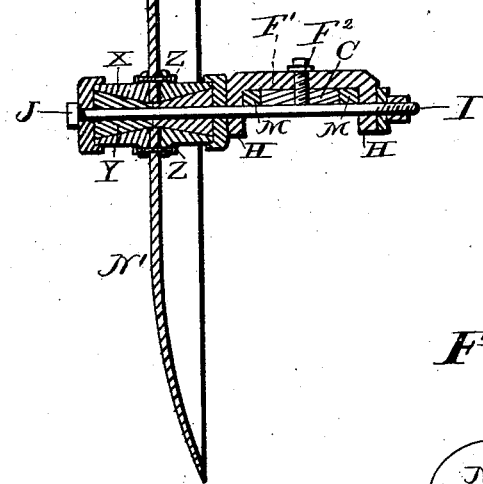
Figure 3:
Figure 4:
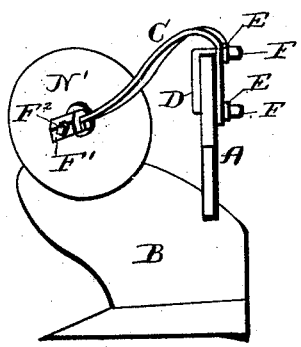

Figure 1 of the drawings is a plan view. Fig. 2 is a detail section. Fig. 3 is a detail section. Fig. 4 is a front view.

Our invention has relation to plow attachments designed to cut sod and cultivate ground as either are turned up by the plow; and it consists in the novel construction and combination of parts, as will be hereinafter fully described, and particularly pointed out in the claims.

Referring by letter to the accompanying drawings, A designates the plow-beam, and B is the plow.

An arm, C, is secured to the plow-beam A by clips D D, bars E E, and securing-nuts F. This arm C extends up over the plow-beam, curves slightly downward, and extends across in front of the mold-board of the plow B, the edge of said arm being in the plane of the line of draft and above the upper edge of the mold-board. Near its outer end the curved arm C is provided with one or more screw-holes, D' D', for the reception of the screw-bolt $F^2$, by which the bearing-clamp F' is secured in place near the outer end of the arm C, so as to be adjusted nearer to or farther from the plow-beam, as may be necessary, by a bolt, $F^2$. The vertical end arms, H, of the bearing-clamp project downwardly below the curved arm C, and are perforated to receive the short shaft or journal I. This shaft or journal I is provided near its rear end with a shoulder, J, and at its front end with a washer, K, and nut L, which hold it rigidly in place. The bearing-clamp F' is prevented from turning on its pivot-bolt $F^2$ by tapering keys or wedges M, inserted between the depending arms of the bearing-clamp and the edges of the arm C. In rear of the curved arm C the shaft I is provided with a rotary cutting-disk, N or N', in the former of which the radial element is straight, and in the latter of which the radial element is curved. These two forms of disks are employed in this connection for the reason that experience has taught us that the disk having the straight radial line will work better in sod ground, while the disk with the concavo-convex radial line or element will work to better advantage in old ground, for the reason that in the latter the soil is loose and not so compact as in sod ground.

By this attachment the disk will operate to cut out or separate the leaf or surface of earth from the ground that follows the mold-board back of the disk, thus leaving the leaf or surface independent of the other portion turned over.

In operation the leaf above referred to is thrown ahead of the plow into the furrow. The leaf leaves the disk in the opposite direction from the point where the disk commenced to cut it.

Each of the disks is provided with a hub, X, to which a sleeve, Y, or dust-cap is secured by bolts Z. The sleeves Y are bored centrally for the reception of the journal, and are frustums of cones in outline. The hub X is made in two sections flanged at their adjacent or meeting ends, and bolts are passed through their flanges to secure the sections together, nuts being employed to retain the bolts in place. The disk in each instance is connected with the hub by bolts, and the disks can be moved near to or away from the mold-board. Two washers or dust-caps are provided on each end of the hub.

The arm C is constructed of spring-steel, so that it possesses the requisite resiliency, and is not likely to be broken in use.

Having described this invention, what we claim, and desire to secure by Letters Patent, is—

1. The combination, with the plow and the curved perforated arm clipped to the plow-beam, of the adjustable clamp, the journal, and the rotary cutting-disk on the rear end of said journal, substantially as specified.

2. The combination, with the plow and the curved arm secured to the plow-beam, of the adjustable bearing-clamp, its journal, the bolt F, the wedges M, and the rotary concavo-convex disk, substantially as specified.

In testimony whereof we affix our signatures in presence of two witnesses.

JOSEPH J. GOETZENBERGER.
OLE S. WANGSNES.

Witnesses:
MICHAEL H. GOOLEY,
AUGUST ENGSTRAND.